(12) United States Patent
Wang et al.

(10) Patent No.: US 10,981,816 B1
(45) Date of Patent: Apr. 20, 2021

(54) METHOD AND DEVICE FOR TREATING HIGH-CALCIUM WASTEWATER BY CALCIFICATION BLOCKING

(71) Applicant: Guangxi University, Guangxi (CN)

(72) Inventors: Shuangfei Wang, Guangxi (CN); Jian Zhang, Guangxi (CN); Chengrong Qin, Guangxi (CN); Peng Gan, Guangxi (CN); Shanshan Zhao, Guangxi (CN); Ling Peng, Guangxi (CN); Jingyang Lu, Guangxi (CN); Zhiwei Wang, Guangxi (CN)

(73) Assignee: GUANGXI UNIVERSITY COLLEGE OF LIGHT INDUSTRY AND FOOD ENGINEERING, Guangxi (CN)

( * ) Notice: Subject to any disclaimer, the term of this patent is extended or adjusted under 35 U.S.C. 154(b) by 0 days.

(21) Appl. No.: 16/885,345

(22) Filed: May 28, 2020

(51) Int. Cl.
*C02F 3/28* (2006.01)
*C02F 5/08* (2006.01)
*C02F 5/04* (2006.01)
*C02F 3/00* (2006.01)

(52) U.S. Cl.
CPC .......... *C02F 3/2893* (2013.01); *C02F 3/2833* (2013.01); *C02F 3/2873* (2013.01); *C02F 5/04* (2013.01); *C02F 5/086* (2013.01); *C02F 2003/001* (2013.01); *C02F 2303/20* (2013.01); *C02F 2303/22* (2013.01)

(58) Field of Classification Search
CPC ...... C02F 3/2893; C02F 3/2873; C02F 5/086; C02F 5/04; C02F 3/2833; C02F 2003/001; C02F 2303/20; C02F 2303/22
USPC ................ 210/603, 631, 615, 616, 617, 259
See application file for complete search history.

(56) References Cited

U.S. PATENT DOCUMENTS

| 4,587,021 A * | 5/1986 | Wheeler | C02F 5/12 106/14.05 |
| 6,508,929 B1 * | 1/2003 | Mercer | C02F 1/46104 204/271 |

* cited by examiner

*Primary Examiner* — Fred Prince
(74) *Attorney, Agent, or Firm* — Tutunjian & Bitetto, P.C.

(57) ABSTRACT

The present invention belongs to the technical field of wastewater treatment, and particularly relates to a method for pre-conditioning high-calcium wastewater by calcification blocking, and a device for implementing the method. The method for treating high-calcium wastewater by calcification blocking includes mixing high-calcium wastewater, an alkalizing agent and a chelating agent, and carrying out alkalizing conditioning pretreatment under a condition of stirring by bubbling of a biogas, so as to obtain pre-conditioned wastewater. The pre-conditioned wastewater is mixed with anaerobic granular sludge, and an anaerobic reaction is performed in a high hydraulic shear flow field formed by the biogas, so as to generate the biogas and calcium scale. A part of the biogas for the stirring is refluxed by bubbling of the biogas and the rest of the biogas is refluxed for forming the high hydraulic shear flow field.

20 Claims, 2 Drawing Sheets

20 — Mixing high-calcium wastewater, an alkalizing agent and a chelating agent, and performing alkalizing and conditioning pretreatment under a condition of stirring by bubbling of a biogas, so as to obtain pre-conditioned wastewater 22 — Mixing the pre-conditioned wastewater with anaerobic granular sludge, and performing anaerobic reaction in a high hydraulic shear flow field formed by the biogas, so as to generate the biogas and to prevent calcium scale 24 — Refluxing a part of the biogas for the stirring by bubbling of the biogas, and refluxing the rest of the biogas for forming the high hydraulic shear flow fluid

FIG. 2

METHOD AND DEVICE FOR TREATING HIGH-CALCIUM WASTEWATER BY CALCIFICATION BLOCKING

TECHNICAL FIELD

The present invention belongs to the technical field of wastewater treatment, and particularly relates to a method for treating high-calcium wastewater by calcification blocking, and a device for implementing the method.

BACKGROUND

For wastewater treatment, an anaerobic biological treatment technology, especially an anaerobic granular sludge technology, is widely used in the field of high-concentration organic wastewater treatment at home and abroad due to its advantages of less amount of sludge, high biological treatment efficiency and low cost.

As the most common anaerobic reactor applying the anaerobic granular sludge technology, an IC anaerobic reactor is an efficient internal circulation anaerobic reactor. The IC anaerobic reactor consists of an upper reaction chamber and a lower reaction chamber, where the reaction chambers are filled with anaerobic granular sludge. In the IC anaerobic reactor, the lower part is a high-load part and the upper part is a low-load treatment part for advanced treatment. The biogas generated by the lower anaerobic reaction chamber of the IC anaerobic reactor is used as power to realize the internal circulation of the lower mixed liquor, so that reinforced pretreatment of the wastewater is obtained, and meanwhile, the second reaction chamber at the upper part continuously carries out post-treatment on the wastewater, such that the effluent can meet the expected treatment requirements.

However, when the IC anaerobic reactor is applied for treating organic wastewater with high hardness, the high content of calcium ions in the initial wastewater (as calculated based on $CaCO_3$, the concentration of calcium ions can reach 300-900 mg/L) will lead to the accumulation of inorganic components such as calcium carbonate, hydroxyapatite and the like in the anaerobic granular sludge, which will lead to the loss of granular sludge with high biomass under the higher rising flow rate in the high-efficiency anaerobic reactor, while the high-calcium sludge with low biomass and high density will deposit on the bottom, resulting in sludge bed hardening and reactor blockage and causing the collapse of the anaerobic system over time.

SUMMARY

In view of this, an objective of the present invention is to provide a method for treating high-calcium wastewater by calcification blocking, which can effectively prevent an anaerobic system from collapsing. The present invention also provides a device used for the method for treating high-calcium wastewater by calcification blocking.

To achieve the above purpose, the present invention provides the following technical solutions:

The present invention provides a method for treating high-calcium wastewater by calcification blocking. The method starts with mixing high-calcium wastewater, an alkalizing agent and a chelating agent, and performing alkalizing and conditioning pretreatment under a condition of stirring by bubbling of a biogas, so as to obtain pre-conditioned wastewater. The pre-conditioned wastewater is mixed with anaerobic granular sludge, and an anaerobic reaction is performed in a high hydraulic shear flow field formed by the biogas, so as to generate the biogas and calcium scale. A part of the biogas is refluxed for the stirring by bubbling of the biogas, and refluxing the rest of the biogas for forming the high hydraulic shear flow field.

Preferably, the alkalizing agent includes sodium hydroxide, potassium hydroxide, sodium carbonate, potassium carbonate, sodium bicarbonate or potassium bicarbonate. The chelating agent can include one or more of sodium tripolyphosphate, potassium tripolyphosphate, sodium pyrophosphate, potassium pyrophosphate, sodium hexametaphosphate, potassium hexametaphosphate, sodium orthophosphate, potassium orthophosphate, sodium dihydrogen phosphate, potassium dihydrogen phosphate, disodium hydrogen phosphate and dipotassium hydrogen phosphate.

Preferably, a dosage of the alkalizing agent is based on the pH value of the pre-conditioned wastewater, and the pH value of the pre-conditioned wastewater is 6.8-7.5; and the dosage of the chelating agent in the high-calcium wastewater is 5-50 ppm.

Preferably, the time for the alkalization conditioning pretreatment is 4-12 h.

Preferably, the time for achieving the anaerobic reaction is 6-24 h.

Preferably, when the high-calcium wastewater is mixed with the alkalizing agent and the chelating agent, the method further includes adding a coagulant or a flocculating agent.

Preferably, the gas-liquid ratio of the refluxed biogas rate to the pre-conditioned wastewater in the anaerobic reaction is (5-10):1.

The present invention further provides a device for implementing the above method for treating high-calcium wastewater by calcification blocking, including an alkalization tower, an IC anaerobic reactor and a double membrane biogas tank. The water outlet of the alkalization tower is connected with the water inlet of the IC anaerobic reactor.

The air outlet of the alkalization tower is in communication with or connected with the air inlet of the double membrane biogas tank through a first gas collecting tube, and the air outlet of the IC anaerobic reactor is in communication with or connected to the air inlet of the double membrane biogas tank through a second gas collecting tube. The air inlet of the alkalization tower is connected with the air outlet of the double membrane biogas tank through a first gas conveying tube, and the air inlet of the IC anaerobic reactor is connected with the air outlet of the double membrane biogas tank through a second gas conveying tube.

Preferably, a gas distributing device is arranged in the tower body of the alkalization tower, and the gas distributing device is in communication with or connected with the outlet of the first gas conveying tube.

Preferably, the first gas conveying tube and the second gas conveying tube are respectively provided with a first pressure pump and a second pressure pump thereon.

The present invention provides a method for treating high-calcium wastewater by calcification blocking. The method includes mixing high-calcium wastewater, an alkalizing agent and a chelating agent, and carrying out alkalizing conditioning pretreatment under a condition of stirring by bubbling of a biogas, so as to obtain pre-conditioned wastewater. The pre-conditioned wastewater is mixed with anaerobic granular sludge, and an anaerobic reaction is performed in a high hydraulic shear flow field formed by the biogas, so as to generate the biogas and calcium scale. A part of the biogas is refluxed for the stirring by bubbling of the biogas, and the rest of the biogas is refluxed for forming the high hydraulic shear flow field. According to the present invention, an alkalization conditioning pretreatment link of the high-calcium wastewater is added before the anaerobic treatment is carried out on the high-calcium wastewater, so that a biogas internal circulation is formed under the condition of stirring by bubbling of the biogas, which is beneficial for rising of the wastewater and improves the alkalization conditioning pretreatment effect on the high-calcium wastewater. By adding the alkalizing agent and the chelating agent, the dissolution of $CO_2$ in calcium-containing wastewater is promoted to form high alkalinity, such that the conversion of calcium ions towards soluble non-ionic calcium compounds is accelerated, and calcium pre-crystallization is facilitated, thereby reducing the concentration of calcium ions in the wastewater and slowing down the subsequent calcification of anaerobic granular sludge. At the same time, refluxing of the biogas is employed to force gas circulation and form a high hydraulic shear flow field during the anaerobic reaction, so that calcium scales such as calcium carbonate and calcium phosphate adsorbed on the surface of the anaerobic granular sludge are peeled off from the outer layer of the anaerobic granular sludge and discharged from the anaerobic reaction system, thereby effectively preventing calcification and hardening of the anaerobic system during the treatment of the high-calcium wastewater.

Furthermore, the method provided by the present invention also adds a coagulant or flocculating agent during the alkalization conditioning pretreatment, which is favorable for removing adhesive substances from the wastewater through air floatation while promoting calcium crystallization.

The test results of the examples show that, by using the method for treating the high-calcium wastewater by calcification blocking as provided by the present invention, it can effectively prevent the hardening of the anaerobic granular sludge and the blockage of the anaerobic system during the process of treating the high-calcium wastewater.

BRIEF DESCRIPTION OF THE DRAWING

FIG. 2 is a block diagram of the method for treating high-calcium wastewater by calcification blocking according to an embodiment of the present invention.

Figure 1:
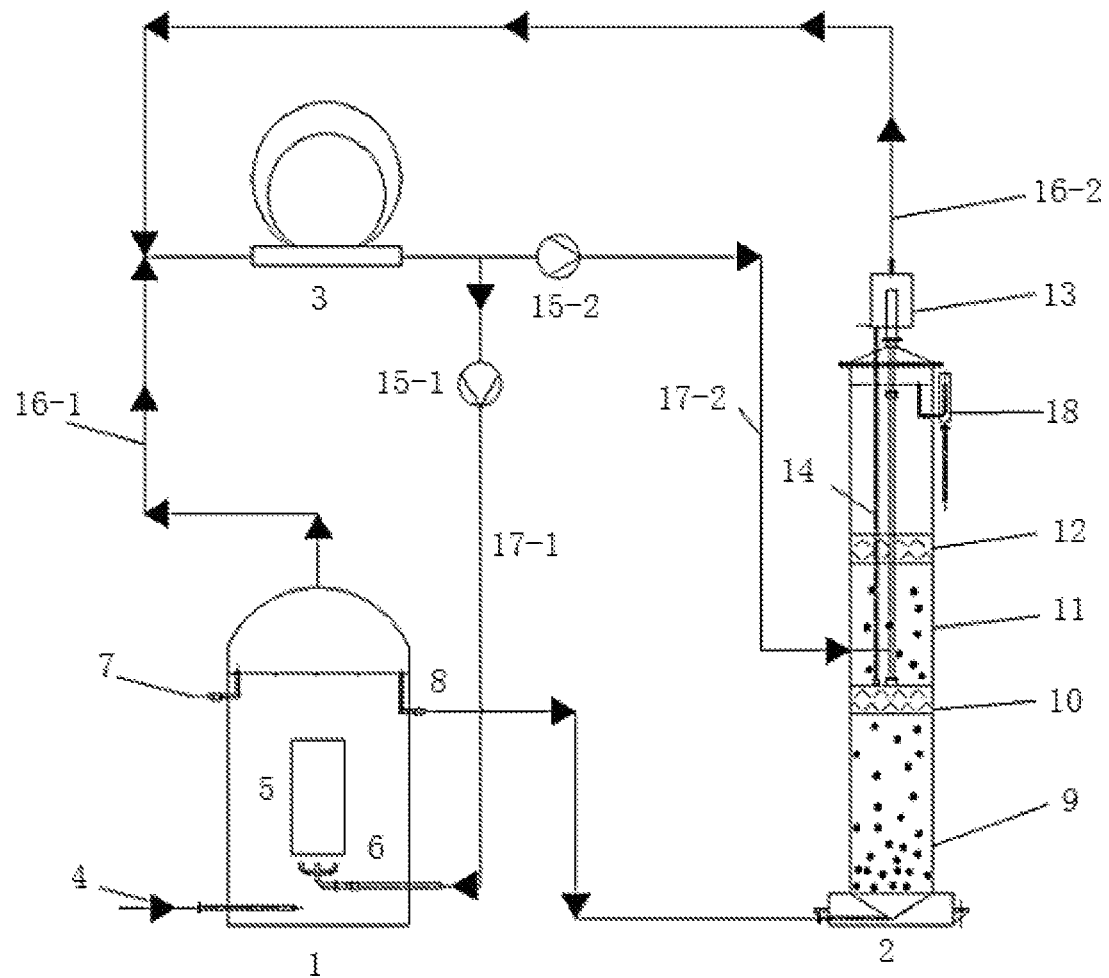
FIG. 1 is a schematic structural diagram of a device for treating high-calcium wastewater by calcification blocking according to the present invention.

In this figure, 1—alkalization tower, 2—IC anaerobic reactor, 3—double membrane biogas tank, 4—water inlet, 5—air-lift pipe, 6—gas distributing device, 7—overflow port, 8—water pipe, 9—first anaerobic reaction chamber, 10—primary three-phase separator, 11—second anaerobic reaction chamber, 12—secondary three-phase separator, 13—gas-liquid separator, 14—return pipe, 15-1—first pressure pump, 15-2—second pressure pump, 16-1—first gas collecting tube, 16-2—second gas collecting tube, 17-1—first gas conveying tube, 17-2—second gas conveying tube, and 18—anaerobic water outlet pipe.

DETAILED DESCRIPTION

Referring to FIG. 2, the present invention provides a method for treating high-calcium wastewater by calcification blocking.

Initially, high-calcium wastewater, an alkalizing agent and a chelating agent are mixed (20), and an alkalizing and conditioning pretreatment is performed under a condition of stirring by bubbling of a biogas, so as to obtain pre-conditioned wastewater (20).

Next, the pre-conditioned wastewater is mixed with anaerobic granular sludge, and an anaerobic reaction is performed in a high hydraulic shear flow field formed by the biogas, so as to generate the biogas and to prevent calcium scale (22).

Finally, a part of the biogas is refluxed for the stirring by bubbling of the biogas, and refluxing the rest of the biogas for forming the high hydraulic shear flow field (24).

In the present invention, the reagents are all commercially available products well known to those skilled in the art, unless otherwise specified.

The high-calcium wastewater is mixed with the alkalizing agent and the chelating agent, and alkalizing and conditioning pretreatment is performed under the condition of stirring by bubbling of the biogas, so as to obtain the pre-conditioned wastewater.

In the present invention, the concentration of calcium ions in the high-calcium wastewater is preferably 300-900 mg/L based on $CaCO_3$.

In the present invention, the alkalizing agent preferably includes sodium hydroxide, potassium hydroxide, sodium carbonate, potassium carbonate, sodium bicarbonate or potassium bicarbonate. In the present invention, the dosage of the alkalizing agent is based on the pH value of the pre-conditioned wastewater, and the pH value of the pre-conditioned wastewater is preferably 6.8-7.5, and more preferably 6.9-7.4. In the present invention, the alkalizing agent is favorable for dissolving carbon dioxide in the biogas to form alkalinity, and generating soluble non-ionic calcium compounds (in particular, chelates) with the calcium ions.

In the present invention, the chelating agent preferably includes one or more of sodium tripolyphosphate, potassium tripolyphosphate, sodium pyrophosphate, potassium pyrophosphate, sodium hexametaphosphate, potassium hexametaphosphate, sodium orthophosphate, potassium orthophosphate, sodium dihydrogen phosphate, potassium dihydrogen phosphate, disodium hydrogen phosphate and dipotassium hydrogen phosphate. In the present invention, the dosage of the chelating agent in the high-calcium wastewater is preferably 5-50 ppm, and more preferably 10-45 ppm. In the present invention, the chelating agent can form soluble chelates with calcium ions, destroy salt crystals such as calcium carbonate and calcium phosphate to form loose and amorphous calcium scales, and reduce the calcification rate of the anaerobic granular sludge.

In the present invention, the time for the alkalization conditioning pretreatment is preferably 4-12 h, and more preferably 5-10 h. The temperature for the alkalization conditioning pretreatment is preferably 18-35° C., and more preferably 20-33° C. The alkalization conditioning pretreatment is carried out under the condition of stirring by bubbling of the biogas. The present invention has no special limitation on the rate of the stirring, and a stirring rate well known to those skilled in the art can be used. In the present invention, the conversion of the calcium ions in the wastewater towards soluble non-ionic calcium compounds is accelerated through the alkalization conditioning pretreatment. The stirring by bubbling of the biogas is beneficial for forming biogas internal circulation during the alkalization conditioning pretreatment process, and promoting the rise of the wastewater, which is beneficial for the alkalization conditioning pretreatment process of the high-calcium wastewater.

According to embodiments of the present invention, when the high-calcium wastewater is mixed with the alkalizing agent and the chelating agent, the method can further includes adding a coagulant or flocculating agent. The coagulant preferably includes polyacrylamide and/or chitosan, and the coagulant is preferably used in a dosage of 5-20 ppm, and more preferably 10-15 ppm. The flocculating agent preferably includes polyaluminum chloride and/or ferric trichloride, and the dosage of the flocculating agent is preferably 10-50 ppm, and more preferably 15-45 ppm. According to one embodiment, the use of the coagulant or the flocculating agent is beneficial for removing adhesive substances from the wastewater through air floatation while promoting calcium crystallization.

After the alkalization conditioning pretreatment, the alkalinity of the high-calcium wastewater is increased, calcium crystals are precipitated, and the calcium ion content in the water body is preliminarily reduced.

In the present invention, after the pre-conditioned wastewater is obtained, the pre-conditioned wastewater is mixed with the anaerobic granular sludge, and the anaerobic reaction is carried out in a high hydraulic shear flow field formed by the biogas, so as to generate the biogas and calcium scales.

According to the present invention, the time for the anaerobic reaction is preferably 6-24 h, and more preferably 8-22 h. In the present invention, temperature for the anaerobic reaction is preferably 25-35° C., and more preferably 27-33° C.

After the biogas is obtained, refluxing of a part of the biogas is used for the stirring by bubbling of the biogas in the alkalization conditioning pretreatment, and refluxing of the rest of the biogas is used for forming a high hydraulic shear flow field in an anaerobic reaction environment. According to an embodiment of the invention, the stirring by bubbling of the biogas is carried out by utilizing refluxing of a part of the biogas, so as to reinforce the mixing under stirring, and the alkalinity of the wastewater is improved by utilizing dissolution of carbon dioxide in the biogas, so that the conversion of calcium ions towards non-ionic states is facilitated.

According to one embodiment, the gas-liquid ratio of the refluxed biogas rate to the pre-conditioned wastewater in the anaerobic reaction is preferably (5-10):1, and more preferably (6-9):1.

The pre-conditioned wastewater enters from the bottom of the anaerobic reactor and is mixed with the anaerobic granular sludge to convert organic pollutants into the biogas, such that it is difficult for the soluble non-ionic calcium compounds generated by the alkaline conditioning pretreatment of the wastewater to enter the inside of the anaerobic granular sludge and be intercepted and form insoluble calcium scales. The rise of the pre-conditioned wastewater in the anaerobic reactor is realized through the gas lift function of the biogas. The biogas pumped into the anaerobic reaction environment forms biogas internal circulation, and a high hydraulic shear flow field is formed at the bottom of the IC anaerobic reactor, so that calcium scales such as calcium carbonate, calcium phosphate and the like adsorbed on the surface of the anaerobic granular sludge are peeled off from the outer layer of the anaerobic granular sludge, calcium scales are facilitated to be discharged out of the anaerobic reactor along with the wastewater, and the anaerobic reactor is effectively prevented from being blocked by calcium scales.

Referring to FIG. 1, and according to a further embodiment, the present invention provides a device for use in the method for pre-conditioning the high-calcium wastewater by calcification blocking, which includes an alkalization tower 1, an IC anaerobic reactor 2 and a double membrane biogas tank 3, which are sequentially communicated.

The device provided by the present invention includes an alkalization tower 1. The alkalization tower is a device containing a cavity, and the alkalization conditioning pretreatment is carried out on the high-calcium wastewater in the cavity.

The bottom of the side wall of the tower body of the alkalization tower 1 is provided with a water inlet 4 for introducing the high-calcium wastewater.

The upper part of the side wall in the tower body of the alkalization tower 1 further includes an air-lift pipe 5. According to an embodiment, the present invention has no special limitation on the structure of the air-lift pipe 5, and an air-lift pipe well known to those skilled in the art can be used. The air-lift pipe 5 is favorable for destroying the gas-liquid equilibrium interface of biogas-wastewater in the alkalization conditioning pretreatment, thereby facilitating dissolution of carbon dioxide in the biogas to form carbonate, and improving the alkalinity of the wastewater.

A gas distributing device 6 is also arranged at the lower part in the tower body of the alkalization tower 1. The present invention has no special limitation on the structure of the gas distributing device 6, and a gas distributing device well known to those skilled in the art can be used. The gas distributing device provides biogas bubbling for the alkalization conditioning pretreatment, which is beneficial for forming biogas internal circulation, promoting the rise of the wastewater and facilitating the alkalization conditioning pretreatment process of the high-calcium wastewater. The biogas forms biogas bubbling in the alkalization tower 1 through the gas distributing device connected with a first gas conveying tube 17-1, and then the rising biogas is discharged through an air outlet positioned at the top of the alkalization tower 1, and is introduced into the double membrane biogas tank 3 through a first gas collecting tube 16-1 for subsequent biogas recycling.

The upper end of the side wall of the alkalization tower 1 is also provided with an overflow port 7. The present invention has no special limitation on the structure of the overflow port 7, and an overflow port well known to those skilled in the art can be used. The overflow port 7 is beneficial for ensuring the amount of the wastewater to be subjected to alkalization conditioning in the alkalization tower, so as to prevent incomplete alkalization conditioning pretreatment caused by excessive wastewater, and to prevent insufficient calcification blocking of the high-calcium wastewater due to ineffective alkalization conditioning pretreatment.

The upper end of the side wall of the alkalization tower 1 is also provided with a water outlet. The water outlet is positioned below the horizontal plane of the overflow port 7. The water outlet is connected with the water pipe 8.

According to an embodiment, the chelating agent, the alkalizing agent, the coagulant and the flocculating agent are preferably mixed with the high-calcium wastewater before entering the alkalizing tower; or alternatively are pumped into the high-calcium wastewater quantitatively in the alkalizing tower. The present invention has no special limitation on the agent pumping device in the alkalization tower, as long as the agent pumping device can pump the added agent.

The device provided by the present invention includes an IC anaerobic reactor 2 which is communication with the water outlet of the alkalization tower 1 through a water inlet. The water outlet of the alkalization tower 1 and the water inlet of the anaerobic reactor 2 are connected through the water pipe 8. According to an embodiment of the invention, the anaerobic reaction treatment on the pre-conditioned wastewater is carried out in the IC anaerobic reactor 2. The water inlet of the IC anaerobic reactor 2 is arranged at the bottom of the IC anaerobic reactor 2.

According to an embodiment of the invention, the IC anaerobic reactor includes a first anaerobic reaction chamber 9 and a second anaerobic reaction chamber 11 from bottom to top. The IC anaerobic reactor includes the first anaerobic reaction chamber 9 provided at the bottom of the IC anaerobic reactor 2. The first anaerobic reaction chamber contains anaerobic sludge particles. The anaerobic sludge particles in the first anaerobic reaction chamber undergo an anaerobic reaction with the wastewater that has been subjected to alkalization preconditioning and enters into the first anaerobic reaction chamber from a water inlet. The anaerobic inlet water and the internal circulation mixed liquor in the first anaerobic reaction chamber 9 jointly form a local high hydraulic shear flow field to promote calcium scales such as calcium carbonate, calcium phosphate and the like adsorbed on the surface of the anaerobic granular sludge to be peeled off from the outer layer of the anaerobic granular sludge, and thus the organic pollutants in the inlet water are fully mixed with the anaerobic granular sludge, and then degraded and converted into the biogas.

In the present invention, the concentration of anaerobic granular sludge in the second anaerobic reaction chamber 11 is relatively low, and a part of organic matters not degraded in the first anaerobic reaction chamber 9 is converted into a small amount of the biogas. The second anaerobic reaction chamber 11 is filled with the anaerobic sludge particles, and the refluxed biogas is input into the second anaerobic reaction chamber 11 from the double membrane biogas tank 3 through the second gas conveying tube 17-2 to form a high hydraulic shear flow field, such that the anaerobic reaction occurs in the second anaerobic reaction chamber 11 and calcium scales such as calcium carbonate, calcium phosphate and the like adsorbed on the surface of the anaerobic granular sludge are promoted to be peeled off from the outer layer of the anaerobic granular sludge and discharged from the anaerobic reaction system under the action of the high hydraulic shear flow field, thereby effectively preventing calcification and hardening of the anaerobic system during the treatment of the high-calcium wastewater.

The bottom of the first anaerobic reaction chamber 9 and the bottom of the second anaerobic reaction chamber 11 are respectively provided with gas distributing devices. The present invention has no special limitation on the gas distributing devices, and gas distributing devices well known to those skilled in the art can be used.

According to one embodiment, the IC anaerobic reactor 2 includes a primary three-phase separator 10 arranged between the first anaerobic reaction chamber 9 and the second anaerobic reaction chamber 11. The primary three-phase separator 10 separates the biogas in the first anaerobic reaction chamber 9 from the lifted mixed liquor of muddy water, traps the anaerobic granular sludge in the first anaerobic reaction chamber 9, and guides the biogas along with the moisture out to a gas-liquid separator 13.

The IC anaerobic reactor includes an anaerobic water outlet pipe 18 arranged at the upper end of the side wall of the IC anaerobic reactor 2. The present invention has no special limitation on the structure of the anaerobic water outlet pipe 18, and an anaerobic water outlet pipe well known to those skilled in the art can be used.

A secondary three-phase separator 12 is also provided between the second anaerobic reaction chamber 11 and the anaerobic outlet pipe 18. According to an embodiment of the present invention, the secondary three-phase separator separates the biogas in the second anaerobic reaction chamber 11 from the lifted mixed liquor of muddy water, traps the anaerobic granular sludge in the second anaerobic reaction chamber 11, and guides the biogas along with the moisture out to the gas-liquid separator 13.

According to an embodiment, the IC anaerobic reactor includes the gas-liquid separator 13 arranged at the top of the IC anaerobic reactor 2. The gas-liquid separator 13 includes a gas-liquid separation chamber and an air-lift pipe arranged at the top of the IC anaerobic reactor 2. The bottom of the air-lift pipe is in contact with the upper end face of the primary three-phase separator 10. The top of the gas pipe penetrates through the top of the IC anaerobic reactor 2 into the gas-liquid separation chamber of the gas-liquid separator 13. The gas-liquid separator 13 separates the biogas from the primary three-phase separator 10 and the secondary three-phase separator 12 from the mixed liquor entrained and lifted by its gas-lift action, and the obtained mixed liquor returns to the bottom of the first anaerobic reaction chamber 9 through the return pipe 14 due to density difference and gravity action.

The IC anaerobic reactor includes a return pipe 14 arranged in the middle of the IC anaerobic reactor 2. The return pipe 14 passes through the second anaerobic reaction chamber 11 and the secondary three-phase separator 12 into the gas-liquid separator 13 at the top of the IC anaerobic reactor. The bottom of the return pipe 14 is in contact with the upper end face of the primary three-phase separator 10. The top of the return pipe 14 penetrates through the top of the IC anaerobic reactor 2 into the gas-liquid separator 13. During operation, the wastewater separated by the gas-liquid separator 13 returns to the first anaerobic reaction chamber 9 through the return pipe 14 to be mixed with the inlet water, so that the concentration of the wastewater that has been subjected to alkalization preconditioning can be diluted, and the rising flow rate can be maintained when the amount of the incoming wastewater is insufficient.

The device provided by the present invention includes a double membrane biogas tank 3. The present invention has no special limitation on the structure of the double membrane biogas tank 3, and a double membrane biogas tank well known to those skilled in the art can be used. The double membrane biogas tank 3 has the functions of storing the biogas and outputting the biogas. When the double membrane biogas tank 3 is used for biogas storage, the capacity adjustment is realized by adjusting the air pressure between the inner membrane and the outer membrane in the double membrane biogas tank 3. When the double membrane biogas tank 3 is used for outputting the biogas, the flow regulation of outputting the biogas to the alkalization tower 1 and the IC anaerobic reactor 2 is realized through a first pressure pump 15-1 and a second pressure pump 15-2.

In the present invention, an air outlet at the top end of the alkalization tower 1 is connected with an air inlet of the double membrane biogas tank 3 through a first gas collecting tube 16-1 to form a gas collecting pipeline in the direction of the double membrane biogas tank 3. Meanwhile, an air outlet at the top end of the IC anaerobic reactor is connected with the air inlet of the double membrane biogas tank 3 through a second gas collecting tube 16-2 to form a gas collecting pipeline in the direction of the double membrane biogas tank 3. The air outlet of the double membrane biogas tank 3 is connected with the air inlet of the air distributing device 6 in the alkalization tower 1 through a gas conveying tube 17-1. The air outlet of the double membrane biogas tank 3 is connected with the air inlet in the IC anaerobic reactor through a gas conveying tube 17-2. The air inlet in the IC anaerobic reactor is arranged on the side wall of the IC anaerobic reactor 2 and leads into the second anaerobic reaction chamber 11.

According to yet further embodiments, the device for use in the method for treating the high-calcium wastewater by calcification blocking further includes a first pressure pump 15-1 and a second pressure pump 15-2 which are respectively positioned on the first gas conveying tube 17-1 and the second gas conveying tube 17-2. When the power for the biogas bubbling in the alkalization tower 1 or the biogas refluxing in the IC anaerobic reactor is insufficient, gas is blown via the first pressure pump 15-1 and the second pressure pump 15-2 to forcibly form biogas internal circulation in the alkalization tower 1 or the IC anaerobic reactor 2.

In order to further illustrate the present invention, the method for treating the high-calcium wastewater by calcification blocking as described above with respect to FIG. 2, and the device for implementing the method according to the present invention (FIG. 1) are described in detail below with reference to examples, but they cannot be understood as limiting the claimed scope of the present invention.

The high-calcium wastewater enters the alkalization tower 1 from the water inlet pipe 4. The high-calcium wastewater is mixed with the alkalizing agent and the chelating agent. The pH of the high-calcium wastewater is adjusted to 6.8-7.5. The biogas collected in the double membrane biogas tank 3 is introduced into the gas distributing device 6 of the alkalization tower 1 under the action of the pressure pump 15-1. Under the agitation action of the gas flow of the biogas, the full bubbling and mixing of the biogas with the original wastewater are accelerated, and at the same time, $CO_2$ dissolution plus the high alkalinity formed by the action of the alkalizing agent and the chelating agent promote the precipitation of calcium crystals, so as to obtain the pre-conditioned wastewater.

The biogas in the alkalization tower 1 is conveyed into the double membrane biogas tank 3 through the gas collecting tube 16-1. The pre-conditioned wastewater enters the IC anaerobic reactor 2 through the water pipe 8, and sequentially enters the first anaerobic reaction chamber 9 and the second anaerobic reaction chamber 11 through the water distributing device for biodegradation. Most biodegradable organic matters are converted into the biogas in the first anaerobic reaction chamber 9 and the second anaerobic reaction chamber 11 to serve as power for realizing internal circulation of the lower mixed liquor and reinforcing wastewater treatment. At the same time, the generated biogas rises through the air-lift pipe connecting the primary three-phase separator and the secondary three-phase separator. Due to the air-lift action, part of the muddy water mixture enters the primary three-phase separator 10 of the first anaerobic reaction chamber 9 together with the biogas. The biogas is separated and discharged from the air-lift pipe. The obtained mixed liquor returns to the bottom of the first anaerobic reaction chamber 9 through the return pipe 14 due to density difference and gravity effect, and is fully mixed with the inlet water and the granular sludge, so as to realize internal circulation of the mixed liquor of the whole system. The rising water flow continues to enter the second anaerobic reaction chamber 11 for deep degradation. The generated biogas enters the secondary three-phase separator 12 for collection, is separated by the gas-liquid separator 13 and collected into the double membrane biogas tank 3 through the gas collecting tube 16-2. The muddy water of the second anaerobic reaction chamber 11 is subjected to solid-liquid separation in a mixed-liquor precipitation area, and meanwhile, calcium crystals generated by alkalization conditioning pretreatment settle in the precipitation area, and the supernatant overflows and is discharged through the anaerobic water outlet pipe 18. The precipitated granular sludge can automatically return to the second anaerobic reaction chamber 11, and the treatment of the high-calcium wastewater is completed, where calcium scales and calcium crystals are settled and exported in the precipitation area, and thus the IC anaerobic reactor 2 does not suffer from hardening of the anaerobic granular sludge and blocking of the IC anaerobic reactor.

Example 1

Source and composition of high-calcium wastewater: a recycled paper making enterprise which had a daily average wastewater discharge of 1,000 tons, a wastewater COD concentration of 4,000 mg/L, a calcium ion concentration of 300 mg/L, and a pH value of 5.6 of the wastewater before entering the system.

The wastewater treatment was conducted through a method for treating the high-calcium wastewater by calcification blocking.

The device of the present invention was adopted to operate the method for treating the high-calcium wastewater by calcification blocking, where sodium hydroxide was added into the inlet water of the high-calcium wastewater to adjust the pH value to 6.8-7.5, the chelating agent sodium tripolyphosphate was added according to the content of 5-50 ppm in the water body for alkaline conditioning pretreatment; and the amount of refluxed biogas was controlled according to a gas-liquid ratio of (5-10):1 and the flow rate of the inlet water, so as to obtain the wastewater that had been subjected to alkalization preconditioning.

The obtained wastewater that had subjected to alkalization preconditioning was introduced into an IC anaerobic reactor for anaerobic treatment of the wastewater.

Comparative Example 1

Without the alkalization conditioning pretreatment step, the high-calcium wastewater was directly introduced into an IC anaerobic reactor for wastewater treatment, and the other operations were the same as those in Example 1.

Example 2

The concentration of calcium ions in the high-calcium wastewater was 600 mg/L, and the rest operations were the same as those in Example 1.

Comparative Example 2

The concentration of calcium ions in the high-calcium wastewater was 600 mg/L, and the rest operations were the same as those in Comparative Example 1.

Example 3

The concentration of calcium ions in the high-calcium wastewater was 900 mg/L, and the rest operations were the same as those in Example 1.

Comparative Example 3

The concentration of calcium ions in the high-calcium wastewater was 900 mg/L, and the rest operations were the same as those in Comparative Example 1.

Using a calcium ion rejection rate and the biological activity of granular sludge as reference standards for relieving calcification degree of anaerobic granular sludge, the wastewater treatment effects of Examples 1-3 and Comparative Examples 1-3 were tested. The test method was as follows:

(1) the calcium ion rejection rate was calculated based on the concentrations of the inlet water and outlet water of the anaerobic reactor, as shown in the following equation:

$$r = \frac{C_{In} - C_{Out}}{C_{In}} \times 100\%$$

where, r was a calcium ion rejection rate in %;

$C_{In}$, and $C_{Out}$ were respectively calcium ion concentrations of the inlet water and outlet water of the IC anaerobic reactor respectively, and the unit was $mgCa^{2+}/L$.

(2) The biological activity of the granular sludge was measured according to the gas production rate of the IC anaerobic reactor, and the unit was $m^3$ biogas/kg COD.

The test results are shown in Table 1.

TABLE 1

Wastewater Treatment Test Results of Examples 1-3 and Comparative Examples1-3

| | $C_{Out}$/mg $Ca^{2+}$/L | r/% | Biogas production ($m^3$ biogas/kg COD) |
|---|---|---|---|
| Example 1 | 235-255 | 14.5 | 0.41 |
| Comparative Example 1 | 95-105 | 32.1 | 0.32 |
| Example 2 | 510-555 | 9.5 | 0.38 |
| Comparative Example 2 | 395-425 | 33.1 | 0.29 |
| Example 3 | 805-835 | 7.5 | 0.30 |
| Comparative Example 3 | 650-700 | 22.7 | 0.21 |

As can be seen from Table 1, compared with the ordinary anaerobic treatment process before improvement in Comparative Examples 1-3, in the present invention after the pretreatment alkalization tower and the biogas circulation process are introduced, the rejection rate of calcium ions by the granular sludge is obviously reduced, and the biogas production is obviously increased, indicating that the method provided by the present invention can effectively ensure the biological activity of the anaerobic granular sludge and prevent the anaerobic granular sludge from hardening or even blocking the anaerobic system.

The above descriptions are merely preferred implementations of the present invention. It should be noted that a person of ordinary skill in the art may further make several improvements and modifications without departing from the principle of the present invention, but such improvements and modifications shall also be deemed as falling within the protection scope of the present invention.

What is claimed is:

1. A method for treating high-calcium wastewater by calcification blocking, comprising:
    mixing high-calcium wastewater having a calcium ion concentration of at least 300 mg/L, an alkalizing agent and a chelating agent, and performing alkalizing and conditioning pretreatment under a condition of stirring by bubbling of a biogas, so as to obtain pre-conditioned wastewater;
    mixing the pre-conditioned wastewater with anaerobic granular sludge, and performing anaerobic reaction in a hydraulic shear flow field formed by the biogas, so as to generate the biogas and calcium scale; and
    refluxing a part of the biogas for the mixing by bubbling of the biogas, and refluxing the rest of the biogas for forming the hydraulic shear flow field.

2. The method for treating high-calcium wastewater by calcification blocking according to claim 1, wherein the alkalizing agent comprises one selected from a group consisting of sodium hydroxide, potassium hydroxide, sodium carbonate, potassium carbonate, sodium bicarbonate and potassium bicarbonate; and
    the chelating agent comprises at least one selected from the group consisting of sodium tripolyphosphate, potassium tripolyphosphate, sodium pyrophosphate, potassium pyrophosphate, sodium hexametaphosphate, potassium hexametaphosphate, sodium orthophosphate, potassium orthophosphate, sodium dihydrogen phosphate, potassium dihydrogen phosphate, disodium hydrogen phosphate and dipotassium hydrogen phosphate.

3. The method for treating high-calcium wastewater by calcification blocking according to claim 2, wherein a dosage of the alkalizing agent is based on a pH value of the pre-conditioned wastewater, and the pH value of the pre-conditioned wastewater is in a range of 6.8-7.5; and a dosage of the chelating agent in the high-calcium wastewater is in a range of 5-50 ppm.

4. A device for implementing the method for treating high-calcium wastewater by calcification blocking according to claim 3, comprising:
    an alkalization tower having a water outlet, an air inlet and an air outlet;
    an IC anaerobic reactor having an air inlet, an air outlet and a water inlet connected with the water outlet of the alkalization tower; and
    a double membrane biogas tank having an air inlet and an air output;
    a first gas collecting tube connecting the air outlet of the alkalization tower with the air inlet of the double membrane biogas tank;
    a second gas collecting tube connecting the air outlet of the IC anaerobic reactor with the air inlet of the double membrane biogas tank;
    a first gas conveying tube connecting the air inlet of the alkalization tower with the air outlet of the double membrane biogas tank; and
    a second gas conveying tube connecting the air inlet of the IC anaerobic reactor with the air outlet of the double membrane biogas tank.

5. A device for implementing the method for treating high-calcium wastewater by calcification blocking according to claim 2, comprising:
    an alkalization tower having a water outlet, an air inlet and an air outlet;
    an IC anaerobic reactor having an air inlet, an air outlet and a water inlet connected with the water outlet of the alkalization tower; and
    a double membrane biogas tank having an air inlet and an air outlet;

a first gas collecting tube connecting the air outlet of the alkalization tower with the air inlet of the double membrane biogas tank;
a second gas collecting tube connecting the air outlet of the IC anaerobic reactor with the air inlet of the double membrane biogas tank;
a first gas conveying tube connecting the air inlet of the alkalization tower with the air outlet of the double membrane biogas tank; and
a second gas conveying tube connecting the air inlet of the IC anaerobic reactor with the air outlet of the double membrane biogas tank.

6. The device according to claim 5, further comprising a gas distributing device arranged in a tower body of the alkalization tower, the gas distributing device being connected with an outlet of the first gas conveying tube.

7. The method for treating high-calcium wastewater by calcification blocking according to claim 1, wherein a dosage of the alkalizing agent is based on a pH value of the pre-conditioned wastewater, where the pH value of the pre-conditioned wastewater is in a range of 6.8-7.5; and a dosage of the chelating agent in the high-calcium wastewater is in a range of 5-50 ppm.

8. A device for implementing the method for treating high-calcium wastewater by calcification blocking according to claim 7, comprising:
an alkalization tower having a water outlet, an air inlet and an air outlet;
an IC anaerobic reactor having an air inlet, an air outlet and a water inlet connected with the water outlet of the alkalization tower; and
a double membrane biogas tank having an air inlet and an air outlet;
a first gas collecting tube connecting the air outlet of the alkalization tower with the air inlet of the double membrane biogas tank;
a second gas collecting tube connecting the air outlet of the IC anaerobic reactor with the air inlet of the double membrane biogas tank;
a first gas conveying tube connecting the air inlet of the alkalization tower with the air outlet of the double membrane biogas tank; and
a second gas conveying tube connecting the air inlet of the IC anaerobic reactor with the air outlet of the double membrane biogas tank.

9. The device according to claim 8, further comprising a gas distributing device arranged in a tower body of the alkalization tower, the gas distributing device being connected with an outlet of the first gas conveying tube.

10. The method for treating high-calcium wastewater by calcification blocking according to claim 1, wherein a time for the alkalization conditioning pretreatment is 4-12 h.

11. A device for implementing the method for treating high-calcium wastewater by calcification blocking according to claim 10, comprising:
an alkalization tower having a water outlet, an air inlet and an air outlet;
an IC anaerobic reactor having an air inlet, an air outlet and a water inlet connected with the water outlet of the alkalization tower; and
a double membrane biogas tank having an air inlet and an air output;
a first gas collecting tube connecting the air outlet of the alkalization tower with the air inlet of the double membrane biogas tank;
a second gas collecting tube connecting the air outlet of the IC anaerobic reactor with the air inlet of the double membrane biogas tank;
a first gas conveying tube connecting the air inlet of the alkalization tower with the air outlet of the double membrane biogas tank; and
a second gas conveying tube connecting the air inlet of the IC anaerobic reactor with the air outlet of the double membrane biogas tank.

12. The method for treating high-calcium wastewater by calcification blocking according to claim 1, wherein when the high-calcium wastewater is mixed with the alkalizing agent and the chelating agent, the method further comprises adding a coagulant or a flocculating agent.

13. A device for implementing the method for treating high-calcium wastewater by calcification blocking according to claim 12, comprising:
an alkalization tower having a water outlet, an air inlet and an air outlet;
an IC anaerobic reactor having an air inlet, an air outlet and a water inlet connected with the water outlet of the alkalization tower; and
a double membrane biogas tank having an air inlet and an air output;
a first gas collecting tube connecting the air outlet of the alkalization tower with the air inlet of the double membrane biogas tank;
a second gas collecting tube connecting the air outlet of the IC anaerobic reactor with the air inlet of the double membrane biogas tank;
a first gas conveying tube connecting the air inlet of the alkalization tower with the air outlet of the double membrane biogas tank; and
a second gas conveying tube connecting the air inlet of the IC anaerobic reactor with the air outlet of the double membrane biogas tank.

14. The method for treating high-calcium wastewater by calcification blocking according to claim 1, wherein a time for achieving an anaerobic reaction is 6-24 h.

15. A device for implementing the method for treating high-calcium wastewater by calcification blocking according to claim 14, comprising:
an alkalization tower having a water outlet, an air inlet and an air outlet;
an IC anaerobic reactor having an air inlet, an air outlet and a water inlet connected with the water outlet of the alkalization tower; and
a double membrane biogas tank having an air inlet and an air outlet;
a first gas collecting tube connecting the air outlet of the alkalization tower with the air inlet of the double membrane biogas tank;
a second gas collecting tube connecting the air outlet of the IC anaerobic reactor with the air inlet of the double membrane biogas tank;
a first gas conveying tube connecting the air inlet of the alkalization tower with the air outlet of the double membrane biogas tank; and
a second gas conveying tube connecting the air inlet of the IC anaerobic reactor with the air outlet of the double membrane biogas tank.

16. The method for treating high-calcium wastewater by calcification blocking according to claim 1, wherein the gas-liquid ratio of the refluxed biogas rate to the pre-conditioned wastewater in the anaerobic reaction is (5-10):1.

17. A device for implementing the method for treating high-calcium wastewater by calcification blocking according to claim 16, comprising:
- an alkalization tower having a water outlet, an air inlet and an air outlet;
- an IC anaerobic reactor having an air inlet, an air outlet and a water inlet connected with the water outlet of the alkalization tower; and
- a double membrane biogas tank having an air inlet and an air outlet;
- a first gas collecting tube connecting the air outlet of the alkalization tower with the air inlet of the double membrane biogas tank;
- a second gas collecting tube connecting the air outlet of the IC anaerobic reactor with the air inlet of the double membrane biogas tank;
- a first gas conveying tube connecting the air inlet of the alkalization tower with the air outlet of the double membrane biogas tank; and
- a second gas conveying tube connecting the air inlet of the IC anaerobic reactor with the air outlet of the double membrane biogas tank.

18. A device for implementing the method for treating high-calcium wastewater by calcification blocking according to claim 1, comprising:
- an alkalization tower having a water outlet, an air inlet and an air outlet;
- an IC anaerobic reactor having an air inlet, an air outlet and a water inlet connected with the water outlet of the alkalization tower; and
- a double membrane biogas tank having an air inlet and an air outlet;
- a first gas collecting tube connecting the air outlet of the alkalization tower with the air inlet of the double membrane biogas tank;
- a second gas collecting tube connecting the air outlet of the IC anaerobic reactor with the air inlet of the double membrane biogas tank;
- a first gas conveying tube connecting the air inlet of the alkalization tower with the air outlet of the double membrane biogas tank; and
- a second gas conveying tube connecting the air inlet of the IC anaerobic reactor with the air outlet of the double membrane biogas tank.

19. The device according to claim 18, further comprising a gas distributing device arranged in a tower body of the alkalization tower, the gas distributing device being connected with an outlet of the first gas conveying tube.

20. The device according to claim 19, wherein the first gas conveying tube and the second gas conveying tube are respectively provided with a first pressure pump and a second pressure pump thereon.

* * * * *

UNITED STATES PATENT AND TRADEMARK OFFICE
CERTIFICATE OF CORRECTION

PATENT NO. : 10,981,816 B1
APPLICATION NO. : 16/885345
DATED : April 20, 2021
INVENTOR(S) : Shuangfei Wang et al.

Page 1 of 1

It is certified that error appears in the above-identified patent and that said Letters Patent is hereby corrected as shown below:

In the Specification

Column 11, Line 23, *mgCa$^{2\pm}$/L* should be *mgCa$^{2+}$/L*

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*